United States Patent [19]
Banike

[11] Patent Number: 5,327,659
[45] Date of Patent: Jul. 12, 1994

[54] WET FILM THICKNESS GAUGE
[75] Inventor: Ronald A. Banike, Orland Park, Ill.
[73] Assignee: R. R. Donnelley & Sons Co., Lisle, Ill.
[21] Appl. No.: 985,020
[22] Filed: Dec. 3, 1992
[51] Int. Cl.⁵ .............................................. G01B 5/02
[52] U.S. Cl. ......................................... 33/834; 33/832
[58] Field of Search .......................... 33/834, 832, 833

[56] References Cited
U.S. PATENT DOCUMENTS

| | | | |
|---|---|---|---|
| 2,507,592 | 5/1950 | Euverard | 33/834 |
| 3,019,645 | 2/1962 | Lake | 33/834 |
| 3,128,558 | 4/1964 | Euverard | 33/834 |
| 3,758,957 | 9/1973 | Eskijian | 33/834 |
| 4,169,319 | 10/1979 | Gardner | 33/834 |
| 4,235,018 | 11/1980 | Säberg | 33/834 |
| 4,377,037 | 3/1983 | Taylor | 33/834 |
| 4,776,099 | 10/1988 | Euverard | 33/834 |
| 5,094,009 | 3/1992 | Koch et al. | 33/834 |
| 5,235,756 | 8/1993 | Wickenhaver | 33/834 |

*Primary Examiner*—Christopher W. Fulton
*Attorney, Agent, or Firm*—Wood, Phillips, VanSanten, Hoffman & Ertel

[57] ABSTRACT

In order to achieve relative simplicity in a reliable measurement technique, an apparatus and method for measuring wet film thickness on a surface is disclosed. The apparatus includes a fixture adapted to be positioned in close proximity to the surface, a gauge supported by the fixture for movement toward and away from the surface, and a spacer for spacing the fixture at a selected distance from the surface. The gauge is moveable from a first position out of contact with the wet film to a second position in contact with the surface to create a measurable spot of the wet film on the gauge. The method includes providing a gauge supported for movement toward and away from the surface, moving the gauge into contact with the surface to create a measurable wet film spot, and moving the gauge out of contact with the wet film to measure the spot. When this has been achieved, the method includes the further step of taking a measurement of the wet film spot and converting the measurement to a wet film thickness, preferably by utilizing a calibration graph that has been created by utilizing a test plate having a tapered channel of known depth.

24 Claims, 2 Drawing Sheets

CALIBRATION GRAPH

TEST CHANNEL TAPER

WET FILM THICKNESS GAUGE

FIELD OF THE INVENTION

The present invention is generally related to various techniques for accurately measuring a wet film thickness and, more particularly, an apparatus and method for measuring wet film thickness on a flat surface or a stationary roller for any wet film measurement such as ink, paint, viscus coatings and the like.

BACKGROUND OF THE INVENTION

In a number of industries, it is important to determine the thickness of a wet film applied to a surface in order to check the accuracy of a coating operation. For this purpose, instruments have been used which have been rather complex and expensive or have required a skilled operator to obtain satisfactory accuracy. As a result, there have been a number of efforts to overcome the difficulties that have been encountered with prior art instruments.

In this connection, the most accurate of the prior art film thickness instruments were designed for measuring a dry or hard film. Such instruments typically took the form of micrometers, electronic and magnetic devices, but the accuracy of e.g. micrometers has either been largely dependent upon the skill of the operator using the instrument or have simply not provided the desired accuracy over a range of interests or have otherwise failed to give reasonably direct readings of film thickness. In addition, because of the dependency upon the properties of the film coating, e.g., surface tension, prior art instruments are subject to considerable error.

In order to measure the thickness of a film, a variety of devices have been proposed. Among these are Euverard U.S. Pat. No. 2,507,592, Euverard U.S. Pat. No. 3,128,558, and Lake U.S. Pat. No. 3,019,645 which all utilize either a concave groove in a roller wherein the groove is of varying depths or a roller which has a variable radius in order to determine the depth of a wet film, and Eskijian U.S. Pat. No. 3,758,957 in which the tip of a male threaded shank is advanced until it is just touching upon an outer film surface wherein a gap between a calibrated gauge nut and a probe body can be measured as indicative of wet film thickness. In addition, Euverard U.S. Pat. No. 4,776,099 discloses yet another type of wet film thickness gauge.

While these prior art instruments address problems noted herein above, they still do not fully achieve relative simplicity and a reliable measurement technique. As a result, the present invention is directed to overcoming the foregoing problems and accomplishing the resulting objectives.

SUMMARY OF THE INVENTION

It is therefore a principal object of the present invention to provide an improved wet film thickness measurement technique. It is a further object of the present invention to provide an apparatus and method for measuring wet film thickness on a surface. It is still another object of the present invention to provide relative simplicity in a reliable measurement technique.

Accordingly, the present invention is directed to an apparatus for measuring wet film thickness on a surface which includes a fixture adapted to be positioned in close proximity to the surface and gauge means supported by the fixture for movement toward and away therefrom. The apparatus also includes means for spacing the fixture at a selected distance from the surface. With these features, means are provided for moving the gauge means from a first position out of contact with the wet film to a second position in contact with the surface to create a measurable spot of the wet film on the gauge means.

In the exemplary embodiment, the gauge means comprises a gauge ball and the measurable spot comprises a film spot diameter on the gauge ball. Advantageously, the gauge ball is supported by the fixture on a rod extending through a bearing in the fixture for axial movement relative thereto. In addition, the spacing means preferably comprises a pair of spacer legs for positioning the gauge ball in confronting relation to the wet film.

In a highly preferred embodiment, the pair of spacer legs will also be understood to space the fixture at a selected distance from the surface. For this purpose, the spacer legs preferably have feet generally conforming to the contour of the surface.

Preferably, the fixture has a recess for receiving the gauge ball when the gauge ball is in the first position, i.e., out of contact with the wet film. The recess advantageously has a diameter greater than the diameter of the gauge ball and a depth generally equal to the diameter of the gauge ball. In this connection, the gauge ball is preferably integral with the rod at one end and the rod has a gripping knob integral therewith at the other end. In one embodiment, the contour of the surface is generally planar and the feet are generally coplanar to conform thereto. However, in another embodiment, the contour of the surface is generally arcuate with the feet being generally non-coplanar to conform thereto. In the latter embodiment, the surface comprises a surface of a roller and the feet are disposed in intersecting planes tangential thereto.

In another respect, the present invention is directed to a method of measuring wet film thickness on a surface. The method comprises the step of providing gauge means supported for movement toward and away from the surface. It also includes the step of moving the gauge means from a position out of contact with the wet film to a position in contact with the surface to create a measurable spot of the wet film on the gauge means. It then includes the step of moving the gauge means from the position in contact with the surface to a position out of contact with the wet film to measure the measurable wet film spot on the gauge means. The method additionally includes the step of taking a measurement of the wet film spot and converting the measurement to a wet film thickness. Preferably, the gauge means comprises a gauge ball and the measurement taken is a diameter of the wet film spot on the gauge ball.

In connection with the method, it preferably includes the step of providing a test plate having a tapered channel to provide a calibration graph for determining wet film thickness. The method then advantageously includes the further step of providing a wet film in the taper channel and thereafter contacting the taper channel with the gauge means. More specifically, the method includes the step of contacting the taper channel at locations of known depth and taking the wet film spot measurement for each of the locations.

Still additionally, the method advantageously includes the step of taking the measurement under magnification by using a microscope and converting the measurement using the formula $h = r - (r^2 - l^2/4)^{\frac{1}{2}}$ where h = wet film thickness, r = gauge ball radius and l = wet film spot diameter.

Other objects, advantages and features of the present invention will become apparent from a consideration of the following specification taken in conjunction with the accompanying drawings.

DETAILED DESCRIPTION OF THE PREFERRED EMBODIMENTS

Figure 1:
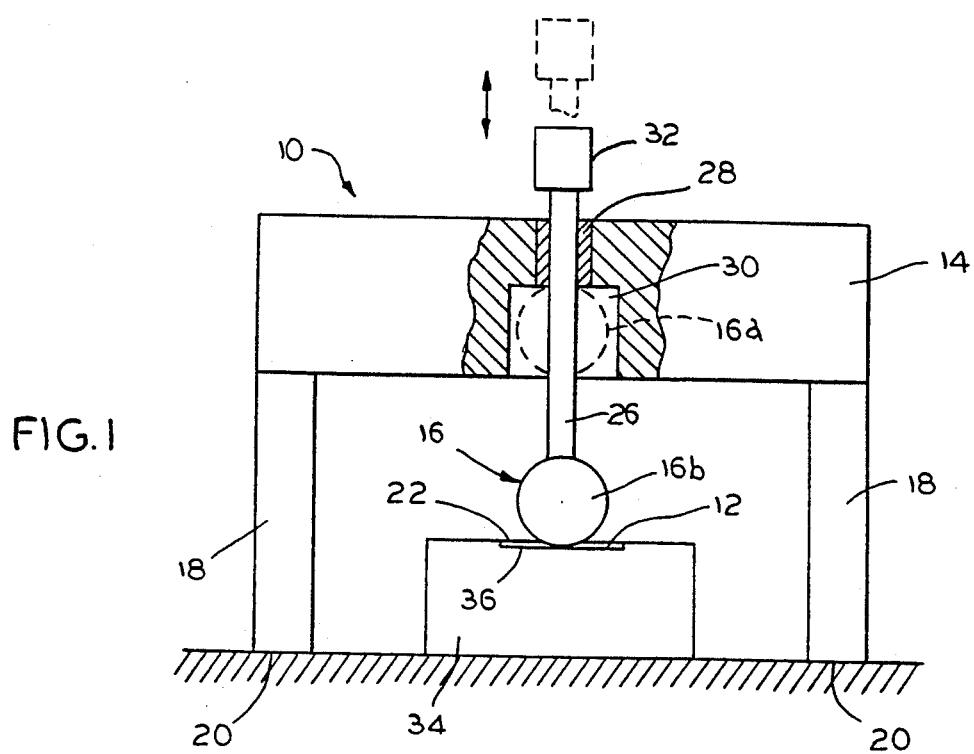
FIG. 1 is a schematic front elevational view of an apparatus for measuring wet film thickness on a surface in accordance with the present invention.

In the illustrations given, and with reference first to FIG. 1, the reference numeral 10 designates generally an apparatus for measuring wet film thickness on a surface 12. The apparatus 10 includes a fixture 14 adapted to be positioned in close proximity to the surface 12, a gauge ball 16 supported by the fixture for movement toward and away therefrom, and a pair of spacer legs 18 for spacing the fixture 14 at a selected distance from the surface 12. As shown, the spacer legs 18 have feet 20 generally conforming to the contour of the surface upon which they rest to thereby position the gauge ball 16 in confronting relation to the wet film 22.

Figure 2:
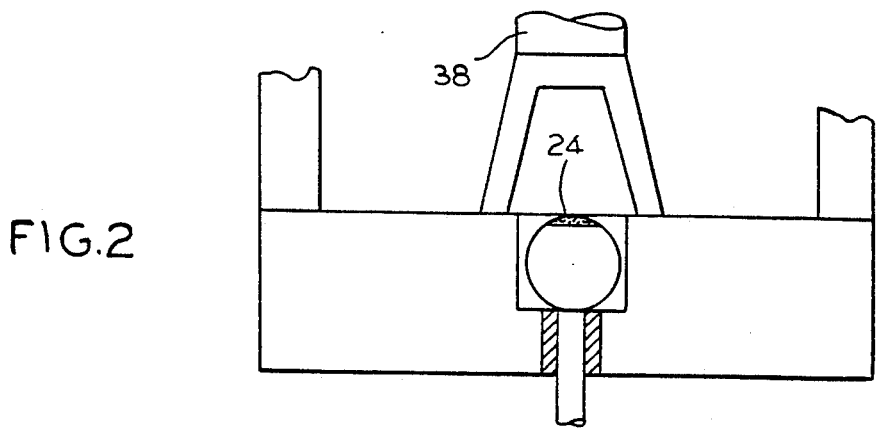
FIG. 2 is a schematic front elevational view of a wet film spot diameter taken under magnification by using a microscope.
Figures 3, 3A:
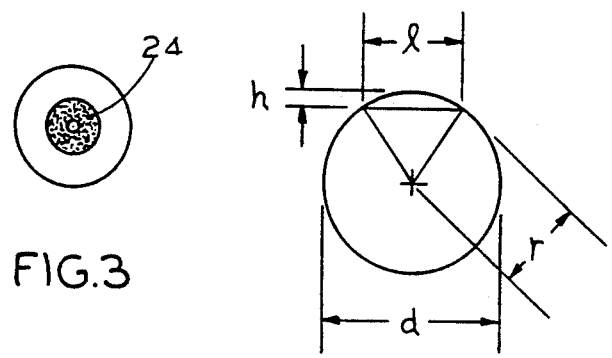
FIG. 3 is a top plan view of a wet film spot on a gauge ball positioned for measurement as illustrated in FIG. 2.
FIG. 3A is a schematic illustration of the dimensions utilized in a mensuration conversion formula.

Still referring to FIG. 1, the apparatus 10 includes means for moving the gauge ball 16 from a first position as at 16a out of contact with the wet film 22 to a second position as at 16b in contact with the surface 12 to create a film spot diameter 24 on the gauge ball 16 (see FIGS. 2 and 3). The film spot diameter 24 is convertible to a thickness or a wet film such as 22 on a surface such as 12. As shown in FIG. 1, the moving means comprises a rod 26 supporting the gauge ball 16 and extending through a bearing 28 in the fixture 14 for axial movement to cause the gauge ball 16 to move from the first position 16a to the second position 16b.

Further, the fixture 14 will be seen to have a recess 30 for receiving the gauge ball 16 when it is in the first position as at 16a. The recess 30 will be understood to have a diameter greater than the diameter of the gauge ball 16 and a depth generally equal to the diameter of the gauge ball 16 (see FIG. 2). With these features of construction, the rod 26 will be seen to extend through the bearing 28 in generally centered relation to the recess 30 in the fixture 14.

As previously suggested, the gauge ball 16 is integral with the rod 26 at one end and a gripping knob 32 is integral with the rod 26 at the other end. It will also be seen that the gripping knob 32 may be knurled to facilitate gripping with the fingers to move the gauge ball 16 from the first position as at 16a to the second position as at 16b and then back again to the first position as at 16a. For this purpose, the bearing 28 may be selected and dimensioned so as to frictionally retain the rod 26 at any position within the limits of travel that are defined by the gauge ball 16 and the gripping knob 32 on the ends thereof.

Figure 1B:
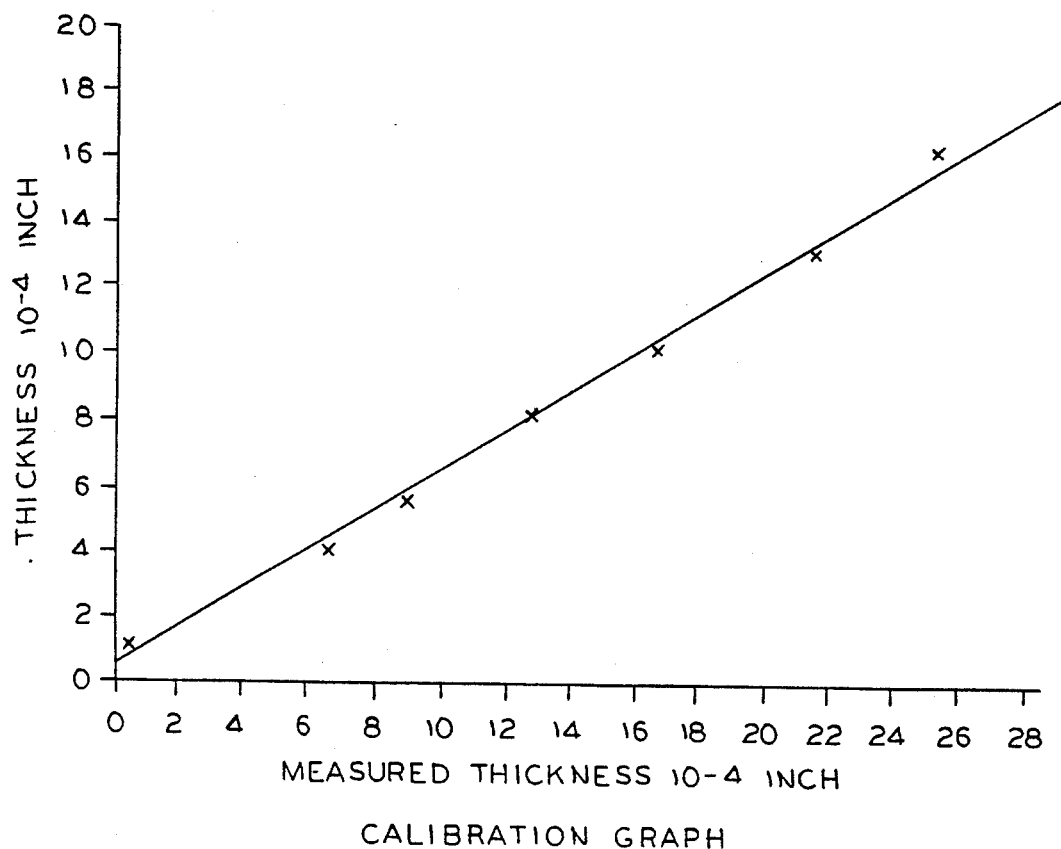
FIG. 1B is a calibration graph of measured thickness utilizing the tapered channel as illustrated in FIG. 1A.
Figure 1A:
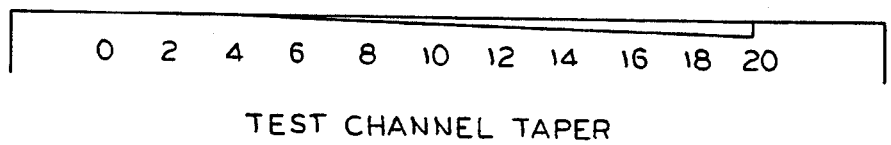
FIG. 1A is a side elevational view of a test plate having a tapered channel as illustrated in FIG. 1.

In the embodiment illustrated in FIG. 1, a test plate 34 having a tapered channel 36 has been provided for the purpose of creating a calibration graph as shown in FIG. 1B. The calibration graph can be utilized for determining wet film thickness for any wet film such as ink, paint, viscous coatings and the like by first providing a wet film such as 22 in the tapered channel 36 and thereafter contacting the tapered channel 36 with the gauge ball 16; specifically, the tapered channel 36 is contacted at locations of known depth (see FIG. 1A) and the wet film spot diameter or measurement 24 is taken for each of those locations. In this manner, any spot diameter of a wet film such as ink, paint, viscous coatings and the like can be converted to a wet film thickness utilizing the calibration graph.

In order to measure the diameter of the wet film spot such as 24, the measurement is taken under magnification by using a microscope 38 (see FIG. 2). By way of example, the microscope 38 may have a 25× magnification with the gauge ball 16 having a diameter of 0.7186" and the tapered channel 36 tapering from 0 to 0.002" in 0.0001" increments over 8". Of course, it will be appreciated that these are merely examples of the perimeters that may be utilized in accordance with the present invention.

Referring once again to FIG. 1, the apparatus 10 has been shown in position for utilization with the test plate 34. It will be appreciated that, for purposes other than creating a calibration graph, the feet 20 of the spacer legs 18 will generally conform to the contour of the surface having the wet film whose thickness is to be determined. In this case, the surface will be generally planar and the feet 20 will be generally coplanar to conform thereto.

Figure 4:
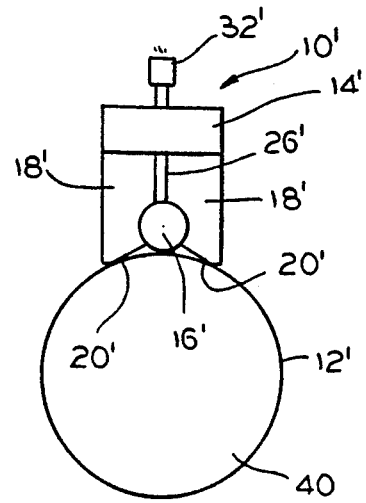
FIG. 4 is a front elevational view illustrating another embodiment of the apparatus shown in FIG. 1.

In another embodiment, the apparatus 10' will be quite similar to the apparatus 10 (see FIG. 4). It will include a fixture 14', a gauge ball 16', a pair of spacer legs 18', and a rod 26' having the gauge ball 16' at one end thereof and a gripping knob 32' at the other end thereof. However, the feet 20' will be formed somewhat differently.

In particular, the apparatus 10' is well suited for use where the contour of the surface such as 12' is generally arcuate. The feet 20' are then generally non-coplanar to conform thereto and, as illustrated in FIG. 4, the surface 12' may comprise a surface of a roller 40 where it may be important to determine the thickness of a wet ink film on the roller when it is stationery for process analysis i.e. distribution, impression, spread and the like. In this connection, the feet 20' will be seen as being disposed in intersecting planes generally tangential to the surface 12' of the roller 40.

From the foregoing, the present invention will be understood as also directed to a method of measuring wet film thickness on a surface. The method includes the step of providing gauge means supported for movement toward and away from the surface. It also includes the step of moving the gauge means from a position out of contact with the wet film to a position in contact with the surface to create a measurable spot of the wet film on the gauge means. It further includes the step of moving the gauge means from the position in contact with the surface to a position out of contact with the wet film to measure the measurable wet film spot on the gauge means. The method additionally includes the step of taking a measurement of the wet film spot and converting the measurement to a wet film thickness. Preferably, the gauge means is a gauge ball and the measurement is converted using the formula $h = r - (r^2 - l^2/4)^{\frac{1}{2}}$ where $h$ = wet film thickness, $r$ = gauge ball radius, and $l$ = wet film spot diameter.

While in the foregoing there have been set forth preferred embodiments of the invention, it will be appreciated that the details herein given are merely for purposes of illustration with the invention being limited only by the scope of the appended claims.

I claim:

1. An apparatus for measuring wet film thickness on a surface, comprising:
    a fixture adapted to be positioned in close proximity to said surface;
    gauge means supported by said fixture for movement toward and away therefrom;
    means for spacing said fixture at a selected distance from said surface; and
    means for moving said gauge means from a first position out of contact with said wet film to a second position penetrating said wet film so as to be in contact with said surface to create a measurable spot of said wet film on said gauge means.

2. The apparatus of claim 1 wherein said gauge means comprises a gauge ball and wherein said measurable spot comprises a film spot diameter on said gauge ball.

3. The apparatus of claim 1 wherein said gauge means is supported by said fixture on a rod extending through said fixture for movement relative thereto.

4. The apparatus of claim 1 wherein said spacing means comprises a pair of spacer legs for positioning said gauge means in confronting relation to said wet film.

5. The apparatus of claim 1 wherein said moving means comprises a rod extending through a bearing in said fixture for axial movement relative thereto.

6. An apparatus for measuring wet film thickness on a surface, comprising:
    a fixture adapted to be positioned in close proximity to said surface;
    a gauge ball supported by said fixture for movement toward and away therefrom;
    means for spacing said fixture at a selected distance from said surface; and
    means for moving said gauge ball from a first position out of contact with said wet film to a second position in contact with said surface to create a film spot diameter on said gauge ball, said film spot diameter being convertible to a thickness for a wet film on said surface, said moving means comprising a rod supporting said gauge ball and extending through a bearing in said fixture for axial movement to cause said gauge ball to move from said first position to said second position.

7. The apparatus of claim 6 wherein said spacing means comprises a pair of spacer legs for positioning said gauge ball in confronting relation to said wet film.

8. The apparatus of claim 6 wherein said fixture has a recess for receiving said gauge ball when said gauge ball is in said first position.

9. The apparatus of claim 8 wherein said recess has a diameter greater than the diameter of said gauge ball and a depth generally equal to the diameter of said gauge ball.

10. The apparatus of claim 8 wherein said rod extends through said bearing in generally centered relation to said recess in said fixture.

11. The apparatus of claim 6 wherein said gauge ball is integral with said rod at one end and including a gripping knob integral with said rod at the other end.

12. The apparatus of claim 6 wherein said spacing means comprises a pair of spacer legs having feet generally conforming to said surface.

13. An apparatus for measuring wet film thickness on a surface, comprising:
    a fixture adapted to be positioned in close proximity to said surface;
    a gauge ball supported by said fixture for movement toward and away therefrom;
    a pair of spacer legs for spacing said fixture at a selected distance from said surface, said spacer legs also positioning said gauge ball in confronting relation to said wet film, said spacer legs having feet generally conforming to the contour of said surface; and
    means for moving said gauge ball from a first position out of contact with said wet film to a second position in contact with said surface to create a film spot diameter on said gauge ball, said film spot diameter being convertible to a thickness for a wet film on said surface, said moving means comprising a rod supporting said gauge ball and extending through a bearing in said fixture for axial movement to cause said gauge ball to move from said first position to said second position;
    said fixture having a recess for receiving said gauge ball when said gauge ball is in said first position, said recess having a diameter greater than the diameter of said gauge ball and a depth generally equal to the diameter of said gauge ball, said rod extending through said bearing in generally centered relation to said recess in said fixture.

14. The apparatus of claim 13 wherein said gauge ball is integral with said rod at one end and including a gripping knob integral with said rod at the other end.

15. The apparatus of claim 13 wherein the contour of said surface is generally planar and said feet are generally coplanar to conform thereto.

16. The apparatus of claim 13 wherein the contour of said surface is generally arcuate and said feet are generally non-coplanar to conform thereto.

17. The apparatus of claim 16 wherein said surface comprises a surface of a roller and said feet are disposed in intersecting planes tangential to said roller.

18. A method of measuring wet film thickness on a surface, comprising the steps of:
    providing gauge means supported for movement toward and away from said surface;
    moving said gauge means from a position out of contact with said wet film to a position in contact with said surface to create a measurable spot of said wet film on said gauge means;
    moving said gauge means from said position in contact with said surface to a position out of contact with said wet film to measure said measurable wet film spot on said gauge means; and
    taking a measurement of said wet film spot and converting said measurement to a wet film thickness.

19. The method of claim 18 wherein said gauge means comprises a gauge ball and wherein said measurement taken is a diameter of said wet film spot on said gauge ball.

20. The method of claim 18 including the step of providing a test plate having a tapered channel to provide a calibration graph for determining wet film thickness.

21. The method of claim 20 including the step of providing a wet film in said tapered channel and thereafter contacting said tapered channel with said gauge means.

22. The method of claim 21 wherein said tapered channel is contacted at locations of known depth and said wet film spot measurement is taken for each of said locations.

23. The method of claim 18 wherein said measurement taken is a diameter of said wet film spot and said measurement is taken under magnification by using a microscope.

24. The method of claim 18 wherein said gauge means is a gauge ball and said measurement is converted using the formula $h = r - (r^2 - l^2/4)^{\frac{1}{2}}$ where $h$ = wet film thickness, $r$ = gauge ball radius, and $l$ = wet film spot diameter.

* * * * *